United States Patent
Nalewajski

[19]

[11] Patent Number: 5,975,133
[45] Date of Patent: Nov. 2, 1999

[54] EMERGENCY WATER TANK RESERVOIR SYSTEM

[76] Inventor: Mieczyslaw T. Nalewajski, 23912 Rosehedge St., Mission Viejo, Calif. 92691

[21] Appl. No.: 09/058,694

[22] Filed: Apr. 10, 1998

[51] Int. Cl.[6] .................................................. E03B 11/00
[52] U.S. Cl. ...................... 137/587; 137/599.1; 137/592
[58] Field of Search ................................ 137/587, 599.1, 137/592

[56] References Cited

U.S. PATENT DOCUMENTS

| | | | |
|---|---|---|---|
| 243,501 | 6/1881 | Brown | 137/592 |
| D. 353,436 | 12/1994 | Hess | D23/202 |
| 1,327,693 | 1/1920 | Bewan | 137/587 |
| 2,534,046 | 12/1950 | Mau | 137/599.1 |
| 2,660,195 | 11/1953 | Risley et al. | 137/599.1 |
| 2,737,199 | 3/1956 | Ingram | 137/599.1 |
| 2,771,944 | 11/1956 | Thornburg | 137/592 |
| 3,095,893 | 7/1963 | Martin | 137/216 |
| 3,951,802 | 4/1976 | Derouineau | 137/599.1 |
| 4,700,734 | 10/1987 | McCauley | 137/236.1 |
| 4,718,452 | 1/1988 | Maitland | 137/592 |
| 4,962,789 | 10/1990 | Benscoter | 137/571 |
| 5,029,612 | 7/1991 | Simbulan | 137/592 |
| 5,046,529 | 9/1991 | Corella | 137/590.5 |
| 5,188,294 | 2/1993 | Sealy et al. | 137/382 |

*Primary Examiner*—A. Michael Chambers
*Attorney, Agent, or Firm*—Larry K. Roberts

[57] ABSTRACT

An emergency water tank reservoir system for a structure having a water supply system including a water supply line is described. The system includes a water tank structure having a top wall, a bottom wall, and a side wall forming a closed tank. The tank structure has an inlet port formed in the side wall and an outlet port opening formed in the side wall. A sediment drain valve opening is disposed into the bottom of the tank at or adjacent the lowest point within the tank for periodically flushing sediments from the tank. A water spout opening is formed into the tank and disposed at an elevation above the sediment drain valve opening for withdrawing water from the tank in emergency situations. A bypass water line is coupled between the inlet and outlet port via a bypass valve system for selectively providing a water bypass line to bypass the tank structure. An inlet check valve is connected at the tank structure inlet port for permitting water flow through the inlet port into the tank structure and preventing water flow from the tank structure out of the inlet port. An outlet check valve is connected at the tank structure outlet port for permitting water flow from the tank structure out of the outlet port, and preventing water flow into the tank structure through the outlet port.

20 Claims, 1 Drawing Sheet

EMERGENCY WATER TANK RESERVOIR SYSTEM

TECHNICAL FIELD OF THE INVENTION

This invention relates to an emergency water supply for residences, offices and industrial buildings.

BACKGROUND OF THE INVENTION

Water supplies can be disrupted for a variety of reasons, from natural disaster to water supply malfunctions. In the event of such a disruption, inhabitants of residential structures can be without a supply of potable water. It would therefore be advantageous to provide an emergency source of water.

SUMMARY OF THE INVENTION

An emergency water tank reservoir system for a structure having a water supply system including a water supply line is described. The system includes a water tank structure having a top wall, a bottom wall, and a side wall forming a closed tank. The tank structure has an inlet port formed in the side wall and an outlet port opening formed in the side wall. A sediment drain valve opening is disposed into the bottom of the tank at or adjacent the lowest point within the tank for periodically flushing sediments from the tank. A water spout opening is formed into the tank and disposed at an elevation above the sediment drain valve opening for withdrawing water from the tank in emergency situations. A bypass water line is coupled between the inlet and outlet port via a bypass valve system for selectively providing a water bypass line to bypass the tank structure. An inlet check valve is connected at the tank structure inlet port for permitting water flow through the inlet port into the tank structure and preventing water flow from the tank structure out of the inlet port. An outlet check valve is connected at the tank structure outlet port for permitting water flow from the tank structure out of the outlet port, and preventing water flow into the tank structure through the outlet port.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
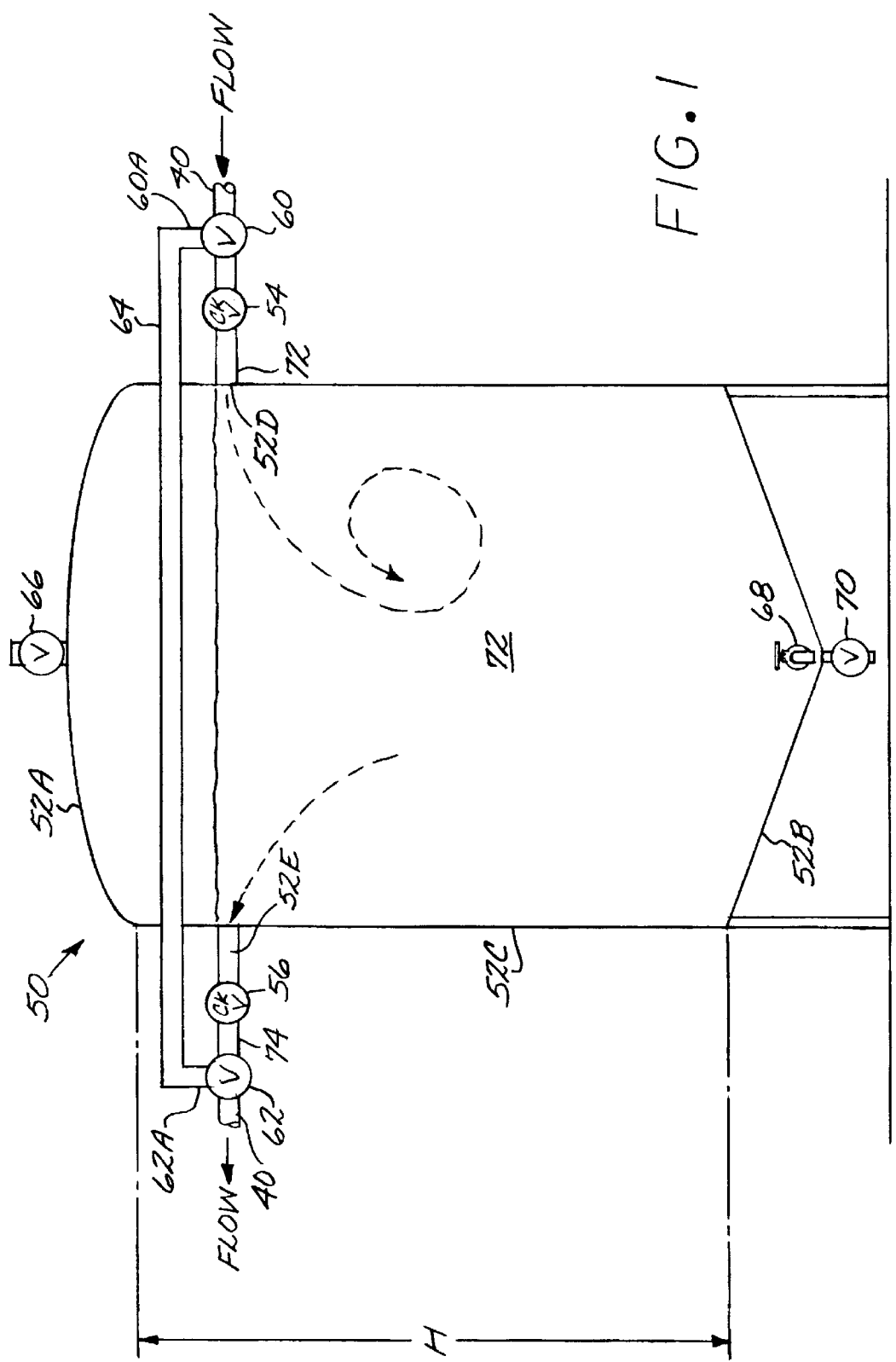
FIG. 1 is a schematic diagram of an emergency drinking water storage tank in accordance with the invention.

FIG. 1 illustrates in schematic form a drinking water supply system 50 in accordance with the invention. The system includes a water tank 52 which is connected to the home water supply line 40. The tank preferably has a capacity of at least 40 gallons. The water tank 52 can be constructed of fiberglass, plastic, metal or other materials used in production of water storage containers. The tank 52 has a dome shaped top wall 52A with a two-way air vent 66 penetrating the wall. The tank 52 further has a V-shaped bottom wall 52B, with a ball valve 70 disposed therein at the lowest point therein. In this exemplary embodiment, the valve 70 is a ½ inch valve, and provides the capability of periodically draining sediment from the supply tank 52.

The tank 52 includes a cylindrical side wall 52C, although other wall shapes could alternatively be employed. In an exemplary embodiment, the side wall has a diameter of about 20 inches, with a height dimension of about 28 inches.

The purpose of the air vent 66 is to permit easy draining of the tank during loss of water pressure on the water supply line, and to purge air from the tank when water pressure is restored. Thus, the air vent 66 permits air to pass into the tank from the ambient, when water in the tank is released from the tank hose bib 68, and permits air to pass out of the tank to purge air when water is released into the tank from the water line 40.

The tank hose bib 68 is located several inches above the sediment drain valve 70. The hose bib is for use in emergency situations, when there is a loss of water pressure in the supply line. Because the hose bib 68 is located several inches above the sediment drain 70, sediment will not be released from the tank even when the water level in the tank reaches the level of the hose bib.

The tank side wall 52C further has defined therein an inlet port 52C and an outlet port 52D. The ports are symmetrically located on opposed ends of a diameter through the tank in this exemplary embodiment, although in other embodiments, the ports may be located asymmetrically and or at different heights from the bottom wall 52B.

An inlet pipe 72 is connected to the inlet port 52D. An output pipe 74 is connected to the outlet port 52E. The water supply line 40 is connected to the inlet port 52D of the tank through an inlet check valve 54 mounted in the inlet pipe 72. The outlet port 52E of the tank, located on the opposite side of the cylindrical side wall 52C of the tank, is connected to the supply line 40 through an outlet check valve 56 mounted in the outlet pipe 74. Also connected in the inlet pipe 72, upstream from the first check valve, is a first three-way bypass ball valve 60. A second three-way bypass ball valve 62 is connected in the outlet pipe 74 and to the water supply line 40 downstream of the second check valve. The check valves and three-way ball valves are conventional plumbing hardware devices, and can be connected using threaded pipe nipples comprising the inlet and outlet pipes 72, 74. One exemplary type of check valve is a pendulum flapper device.

A bypass water line 64 connects between the bypass ports 60A and 62A of the respective valves 60, 62. By placing the ball valves in the bypass position, the water supply line 40 is bypassed around the emergency water tank, should the need arise, without disrupting the water supply to the residence, office or industrial structure. This would permit servicing the emergency tank system 50 without shutting off the water supply.

The check valves 54, 56 will prevent water flow from the tank 52 or into the tank by way of the supply line 40, when there is a loss of water pressure on the supply line 40.

A desired location for the inlet port is at its highest point on a horizontal plane in the tank. This is because, the inlet port is located at a lower location relative to the water level, if the inlet check valve would fail during a water supply failure, when there is no water pressure, water would pour out the inlet port and be lost to the system, but if it is at a high point, the amount of lost water would be minimized. The same reasoning applies for the placement of the outlet port. The outlet and inlet ports could even be placed in the top wall, but then the common type of check valve, the pendulum flapper valve would not work well. As a result, in a preferred embodiment, the outlet and inlet ports are placed on the same high horizontal plane.

The reservoir tank system 50 is connected to the supply line 40 in the same manner that a water heater tank is connected, e.g. by flexible supply line connections and threaded connectors. The location and attachment of the reservoir tank system to the structure is preferably done in a manner to comply with the guidelines of the Unified Building Code. For new construction, the tank system can be placed in a readily accessible location, e.g. the garage, a basement or a closet. In an industrial location, the preferred location would be where there is a constant water flow, near a main or before a water heater.

With the bypass ball valves 60, 62 in the normally open position, and with water pressure on the supply line 40, water will be permitted to flow through the input ball valve and the check valve 54 into the input port 52D of the tank 52 as water is used in the residential structure. The same amount of water will flow out the output port 52E of the tank, meeting the demand due to the opening of a tap, hose bib, shower valve or toilet valve. Thus, during the normal operation of a residential or industrial water supply system, the water in the tank is refreshed, as water flows out the outlet port 52E and is replaced by fresh water flowing into the inlet port 52D. The exchange of water within the tank during normal household use is facilitated by placing the inlet and outlet ports 52C, 52D on opposite sides of the cylindrical side wall 52C of the tank. During emergency use, when there may be no water pressure on the supply line 40, or when the user decides to close the bypass valves 60, 62 to prevent flow of water into the tank from the supply line 40, e.g. if there is a contamination concern, the user can obtain fresh water from the tank 52 through the hose bib 68. In this exemplary embodiment, the user can close the bypass ball valves 60, 62, and open the hose bib 68 to release fresh water into a container, or into a hose, for use for drinking, cooking or other uses during the emergency. Of course, it is not necessary to close the ball valves unless desired to prevent possible contamination of the emergency water supply, indicated as 72 in FIG. 1, from contaminants in the water supply.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An emergency water tank reservoir system for a structure having a water supply system including a water supply line, comprising:

a water tank structure having a top wall, a bottom wall, and a side wall forming a closed tank, the tank structure having an inlet port for connection to an inlet side of the water supply line, and an outlet port opening for connection to an outlet side of the water supply line;

a water spout opening into the tank and disposed at an elevation for withdrawing water from the tank in emergency situations, wherein said water spout opening does not form said inlet port or said outlet port;

a bypass water line coupled between the inlet and outlet port via a bypass valve system for selectively providing a water bypass line connecting the inlet side and the outlet side of the water supply line to bypass the tank structure.

2. The system of claim 1 further including an inlet check valve connected at the tank structure inlet port for permitting water flow through the inlet port into the tank structure and preventing water flow from the tank structure out of the inlet port.

3. The system of claim 1 further including an outlet check valve connected at the tank structure outlet port for permitting water flow from the tank structure out of the outlet port, and preventing water flow into the tank structure through the outlet port.

4. The system of claim 1 further including a sediment drain valve opening into the bottom of the tank at or adjacent the lowest point within the tank for periodically flushing sediments from the tank, said sediment drain valve located at an elevation below an elevation at which said water spout opening is located.

5. The system of claim 4 wherein bottom wall has a conical shape, and wherein said sediment drain opening is located at a tip of the conical shape.

6. The system of claim 1 further comprising a two-way air venting port disposed in a top wall of said tank structure for releasing air from the interior of the tank structure to the outside of the tank structure, and for admitting air into the interior when water is released from said water spout opening.

7. The system of claim 1 wherein said bypass valve system comprises a inlet three-way valve connected upstream of said inlet port and including an inlet bypass port, an outlet three-way valve connected downstream of said outlet port and including an outlet bypass port, and wherein said bypass line is connected between said inlet bypass port and said outlet bypass port.

8. The system of claim 1 wherein said inlet port is positioned on said side wall at an elevation above said water spout opening, and said outlet port is positioned on said side wall at an elevation above said water spout opening.

9. The system of claim 8 wherein said side wall is a generally cylindrical structure, and said inlet port is disposed diametrically opposite said outlet port in said side wall.

10. The system of claim 9 wherein said inlet port and said outlet port are disposed adjacent an upper end of the cylindrical structure.

11. The system of claim 1 further including a hose bib connected to the water spout opening for selectively releasing water from the water spout opening.

12. An emergency water tank reservoir system for a structure having a water supply system including a water supply line, comprising:

a water tank structure having a top wall, a bottom wall, and a side wall forming a closed tank, the tank structure having an inlet port formed in the side wall and an outlet port opening formed in the side wall;

a sediment drain valve opening into the bottom of the tank at or adjacent the lowest point within the tank for periodically flushing sediments from the tank;

a water spout opening into the tank and disposed at an elevation above the sediment drain valve opening for withdrawing water from the tank in emergency situations, wherein said water spout opening does not form said inlet port or said outlet port;

a bypass water line coupled between the inlet and outlet port via a bypass valve system for selectively providing a water bypass line to bypass the tank structure;

an inlet check valve connected at the tank structure inlet port for permitting water flow through the inlet port into the tank structure and preventing water flow from the tank structure out of the inlet port;

an outlet check valve connected at the tank structure outlet port for permitting water flow from the tank structure out of the outlet port, and preventing water flow into the tank structure through the outlet port.

13. The reservoir system of claim 12 further comprising a two-way air venting port disposed in a top wall of said tank structure for releasing air from the interior of the tank structure to the outside of the tank structure, and for admitting air into the interior when water is released from said water spout opening.

14. The reservoir system of claim 12 wherein said bypass valve system comprises a inlet three-way valve connected upstream of said inlet check valve and including an inlet bypass port, an outlet three-way valve connected downstream of said outlet check valve and including an outlet bypass port, and wherein said bypass line is connected between said inlet bypass port and said outlet bypass port.

15. The reservoir system of claim 12 wherein bottom wall has a conical shape, and wherein said sediment drain opening is located at a tip of the conical shape.

16. The system of claim 12 wherein said inlet port is positioned on said side wall at an elevation above said water spout opening, and said outlet port is positioned on said side wall at an elevation above said water spout opening.

17. The system of claim 16 wherein said side wall is a generally cylindrical structure, and said inlet port is disposed diametrically opposite said outlet port in said side wall.

18. The system of claim 12 further including a hose bib connected to the water spout opening for selectively releasing water from the water spout opening.

19. An emergency water tank reservoir system for a structure having a water supply system including a water supply line, comprising:
   a water tank structure having a top wall, a bottom wall, and a side wall forming a closed tank, the tank structure having an inlet port for connection to an inlet side of the water supply line, and an outlet port opening for connection to an outlet side of the water supply line;
   a water spout opening into the tank and disposed at an elevation for withdrawing water from the tank in emergency situations;
   a bypass water line coupled between the inlet and outlet port via a bypass valve system for selectively providing a water bypass line connecting the inlet side and the outlet side of the water supply line to bypass the tank structure, said bypass valve system comprising an inlet three-way valve connected upstream of said inlet port and including an inlet bypass port, an outlet three-way valve connected downstream of said outlet port and including an outlet bypass port, and wherein said bypass line is connected between said inlet bypass port and said outlet bypass port.

20. An emergency water tank reservoir system for a structure having a water supply system including a water supply line, comprising:
   a water tank structure having a top wall, a bottom wall, and a side wall forming a closed tank, the tank structure having an inlet port formed in the side wall and an outlet port opening formed in the side wall;
   a sediment drain valve opening into the bottom of the tank at or adjacent the lowest point within the tank for periodically flushing sediments from the tank;
   a water spout opening into the tank and disposed at an elevation above the sediment drain valve opening for withdrawing water from the tank in emergency situations;
   an inlet check valve connected at the tank structure inlet port for permitting water flow through the inlet port into the tank structure and preventing water flow from the tank structure out of the inlet port;
   an outlet check valve connected at the tank structure outlet port for permitting water flow from the tank structure out of the outlet port, and preventing water flow into the tank structure through the outlet port; and
   a bypass water line coupled between the inlet and outlet port via a bypass valve system for selectively providing a water bypass line to bypass the tank structure, said bypass valve system comprising an inlet three-way valve connected upstream of said inlet check valve and including an inlet bypass port, an outlet three-way valve connected downstream of said outlet check valve and including an outlet bypass port, and wherein said bypass line is connected between said inlet bypass port and said outlet bypass port.

* * * * *